(12) United States Patent
Gigengack et al.

(10) Patent No.: US 11,321,871 B2
(45) Date of Patent: May 3, 2022

(54) METHOD FOR CALIBRATING A DETECTION SYSTEM

(71) Applicant: Robert Bosch GmbH, Stuttgart (DE)

(72) Inventors: Fabian Gigengack, Hannover (DE); Corinna Wright, Thedinghausen (DE); Joern Jachalsky, Wennigsen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/734,458

(22) PCT Filed: Jul. 30, 2019

(86) PCT No.: PCT/EP2019/070422
§ 371 (c)(1),
(2) Date: Dec. 2, 2020

(87) PCT Pub. No.: WO2020/052853
PCT Pub. Date: Mar. 19, 2020

(65) Prior Publication Data
US 2021/0225031 A1    Jul. 22, 2021

(30) Foreign Application Priority Data

Sep. 12, 2018  (DE) .................... 10 2018 215 491.0

(51) Int. Cl.
*G06T 7/80*    (2017.01)

(52) U.S. Cl.
CPC ...... *G06T 7/80* (2017.01); *G06T 2207/30252* (2013.01)

(58) Field of Classification Search
CPC ............ G06T 7/80; G06T 2207/30252; H04N 5/247; H04N 17/002
See application file for complete search history.

(56) References Cited

U.S. PATENT DOCUMENTS

| | | | |
|---|---|---|---|
| 8,532,950 B2* | 9/2013 | Steckhan | G06T 7/33 702/85 |
| 2002/0178061 A1* | 11/2002 | Lam | G06Q 30/0272 705/14.68 |

(Continued)

FOREIGN PATENT DOCUMENTS

| | | |
|---|---|---|
| DE | 102008046545 | 5/2009 |
| DE | 102013021408 A1 | 6/2014 |
| EP | 3301646 | 4/2018 |

OTHER PUBLICATIONS

International Search Report for PCT/EP2019/070422; dated Oct. 15, 2019.

*Primary Examiner* — Zaihan Jiang
(74) *Attorney, Agent, or Firm* — Norton Rose Fulbright US LLP; Gerard Messina

(57) ABSTRACT

A method for calibrating a detection system. The detection system including at least one movable detection device. The method includes: ascertaining at least two possible different positions of the at least one movable detection device, precalibrating the at least one movable detection device based on each of the at least two possible positions, providing precalibration information for the at least two possible positions, —ascertaining an instantaneous positioning of the at least one movable detection device, ascertaining calibration information for the instantaneous position on the basis of the precalibration information, and calibrating the at least one movable detection device in the instantaneous position on the basis of the provided calibration information.

11 Claims, 2 Drawing Sheets

(56) References Cited

U.S. PATENT DOCUMENTS

| | | | |
|---|---|---|---|
| 2011/0216194 A1* | 9/2011 | Kosaki | H04N 7/18 |
| | | | 348/148 |
| 2013/0010081 A1* | 1/2013 | Tenney | G05B 19/4086 |
| | | | 348/47 |
| 2017/0287169 A1 | 10/2017 | Garcia | |
| 2017/0374360 A1* | 12/2017 | Kranski | H04N 17/002 |
| 2018/0272535 A1* | 9/2018 | Ogawa | B25J 9/1692 |
| 2018/0301031 A1* | 10/2018 | Naamani | G06K 9/4604 |
| 2019/0066335 A1* | 2/2019 | Dahlstrom | G06T 7/74 |
| 2020/0160555 A1* | 5/2020 | Mayer | G06T 7/73 |

\* cited by examiner

METHOD FOR CALIBRATING A DETECTION SYSTEM

FIELD

The present invention relates to a method for calibrating a detection system, the detection system including at least one movable detection device.

The present invention further relates to a detection system, including at least one movable detection device.

Although the present invention is applicable in general to any arbitrary detection devices, the present invention is described in relation to detection systems including cameras as the detection devices.

Although the present invention is applicable in general to any arbitrary detection systems, the present invention is described in relation to detection systems in floor conveyors.

BACKGROUND INFORMATION

Multi-camera systems are widely used in the automotive field. They are the basis for surround view applications, for example, such as the parking assistant. These multi-camera systems have lately also found their way into the field of floor conveyors, for example forklifts. Similarly to their use in passenger cars, they are used to visually support the driver or also offer assistance functions, for example a warning of possible collisions. In the case of conventional multi-camera systems, accurate extrinsic calibration of the individual cameras in relation to one another is necessary to be able to interconnect the pieces of information among the cameras. If, for example, the information of a camera directed forward and the information of a camera directed to the side are to be exchanged, the spatial position of the cameras in the three-dimensional space must be determined in relation to one another for the calibration of the cameras. Calibration panels are used for this purpose, for example. The calibration panels include a known pattern having known metric distances, for example a chessboard pattern. Each panel is moreover visible from at least two cameras. This makes it possible to triangulate three-dimensional points, which in turn allow for the three-dimensional position of the cameras in the world to be ascertained in relation to one another.

However, the conventional calibration method requires a rigid camera system. This means that all cameras are immovable in relation to one another. In the case of multi-camera systems for forklifts, for example in the case of a counterbalanced lifting truck, this assumption is violated if the camera directed forward is fastened at the mast. This placing of the camera is opted for, among other things, since the mast would otherwise block the view of the camera. The mast may, however, tilt to the front in order to pick up a load. This changes the relative position of the camera at the mast in relation to the remaining cameras and the previously determined calibration of the multi-camera system is no longer valid.

A method for extrinsically calibrating a camera system including two cameras for an engine-operated vehicle is described in U.S. Patent Application Publication No. US 2017/0287169 A1. External interfering effects, for example mechanical vibrations, result in changes in the orientation of both cameras in relation to one another, thus resulting in a deviation from an initially carried out calibration. Starting from the initial calibration, an iterative recalibration of the yaw axis of the cameras is provided. The recalibration takes place on the basis of the images of the same scene recorded by both cameras, which are compared to one another with the aid of an image processing method.

SUMMARY

In one specific embodiment, the present invention provides a method for calibrating a detection system, the detection system including at least one movable detection device, including the steps:
ascertaining at least two possible different positions of the at least one movable detection device,
precalibrating the at least one movable detection device based on each of the at least two possible positions,
providing precalibration information for the at least two possible positions,
ascertaining one instantaneous positioning of the at least one movable detection device,
ascertaining calibration information for the instantaneous position on the basis of the precalibration information, and
calibrating the at least one movable detection device in the instantaneous position based on the provided calibration information.

In a further specific embodiment, the present invention provides a detection system, including at least one movable detection device, a first ascertainment device designed to ascertain at least two possible different positions of the at least one movable detection device, a precalibration device designed to precalibrate the at least one movable detection device based on each of the at least two possible positions, a provision device designed to provide precalibration information for the at least two possible positions, a positioning device designed to ascertain an instantaneous position of the at least one movable detection device, a second ascertainment device designed to ascertain calibration information for the instantaneous position based on the precalibration information, and a calibration device designed to calibrate the at least one movable detection device in the instantaneous position based on the provided calibration information.

The term "position" is to be understood in the broadest sense and refers to at least one coordinate, pieces of information, data, or the like for a positon and/or orientation of an object.

One of the advantages achieved thereby is that it is possible to determine the position of the movable detection devices at all times. Moreover, the flexibility is increased, since a reliable and simple calibration of any arbitrary detection systems including multiple detection devices is possible.

Further features, advantages, and further specific embodiments of the present invention are described in the following or provided as a result thereof.

According to one advantageous refinement of the present invention, a movement of the at least one movable detection device is modelled for ascertaining possible positions of the at least one movable detection device. One of the advantages achieved thereby is that a plurality of possible positions may be ascertained and configured in a simple and reliable manner.

According to a further advantageous refinement, the calibration of the at least one movable detection device includes the ascertainment based on at least one intermediate position between the at least two possible positions. An advantage thereof is that a movement of the at least one detection device may thus be reliably detected, for example from a starting position to a final position via an intermediate position, and a calibration may reliably take place.

According to a further advantageous refinement of the present invention, the at least one intermediate position is ascertained on the basis of a predefined connecting line model between the at least two possible positions. The advantage thereof is that an intermediate position between the at least two possible positions may be easily ascertained and the at least one movable detection device may thus be reliably calibrated.

According to a further advantageous refinement of the present invention, the at least one intermediate position is ascertained with the aid of the connecting line model in the form of a geodetic line between the at least two possible positions. This allows for an easy and fast calibration.

According to a further advantageous refinement of the present invention, the instantaneous position of the at least one movable detection device is ascertained by the device itself or position information is provided for the at least one movable detection device by an external sensor device. If the instantaneous position of the at least one movable detection device is ascertained by the device itself, a compact design is achieved, whereas if the instantaneous position is provided by an external sensor device, already present information may be easily read out and information may thus be provided to the at least one detection device particularly easily via the instantaneous position.

According to a further advantageous refinement of the present invention, the calibration of the at least one movable detection device in the instantaneous position takes place based on the precalibration information of a position that comes closest to the instantaneous position. A particularly fast and easy calibration may take place in this way.

According to a further advantageous refinement of the present invention, the calibration of the at least one movable detection device in the instantaneous position takes place based on an interpolation on the basis of the calibration information. In this way, an improved estimation for the instantaneous position may be achieved, so that the calibration of the at least one movable detection device may take place even more reliably overall.

According to a further advantageous refinement of the present invention, a plurality of detection devices is situated, of which at least one is movably situated, and the detection areas of at least two detection devices overlap in at least one overlapping area and calibration information for at least one detection device is provided, and correspondences are ascertained based on the at least one overlapping area, and calibration information for calibrating is provided to the at least one movable detection device in the instantaneous position based on the ascertained correspondences. This enables, for example, an ascertainment of an inclination angle, which is exact for an instantaneous position of the ascertainment device and whose plausible or particularly suitable calibration information may be selected from the quantity of the predetermined calibration information. This makes the calibrating even more reliable overall.

According to a further advantageous refinement of the present invention, a plurality of detection devices is situated, of which at least one is movably situated, and the detection devices are subdivided into at least two groups and calibration information for calibrating is provided to the at least one movable detection device in the instantaneous position based on the formed groups.

In this way, the calibrating may be carried out even more reliably, since as a result of the group formation, two determinations of possible calibration information are made possible that are, for example, independent of one another and that are congruent, for example, with an instantaneous rotation angle or, in general, with calibration information for the instantaneous position.

Further features and advantages of the present invention result from the figures, and from the associated description of the figures.

It is understood that the above-mentioned features and the features to be elucidated below are usable not only in the described combination, but also in other combinations or alone without departing from the scope of the present invention.

Preferred embodiments and specific embodiments of the present invention are illustrated in the figures and are explained in greater detail in the description below, identical reference numerals referring to identical or similar or functionally identical components or elements.

DETAILED DESCRIPTION OF EXAMPLE EMBODIMENTS

Figure 1:
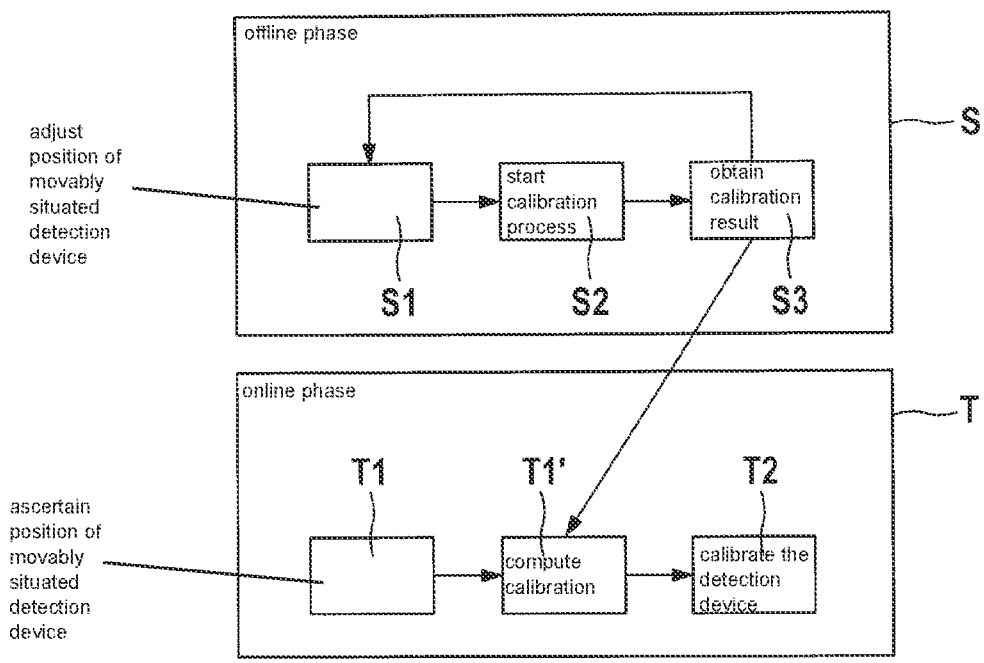
FIG. 1 schematically shows a method according to one specific embodiment of the present invention.

FIG. 1 schematically shows a method according to one specific embodiment of the present invention.

In detail, the method includes an offline phase S and an online phase T. In offline phase S, the position(s)—the term "position" is in this case understood to mean a position and orientation—of a movably situated detection device is/are adjusted (step S1). Subsequently, a calibration process is started (step S2). The calibration result (step S3), which may be available in the form of transformation matrices, is obtained as the output. Steps S1 through S3 are repeated until step S1 covers the complete required motion spectrum of the detection devices, for example cameras. In online phase T, the position of the movably situated detection device is ascertained (step T1) and the calibration congruent with same from the offline or previously ascertained calibration results (step S3) is subsequently computed (step T1'). In step T2, the camera is calibrated with the computed calibration information.

Figure 2:
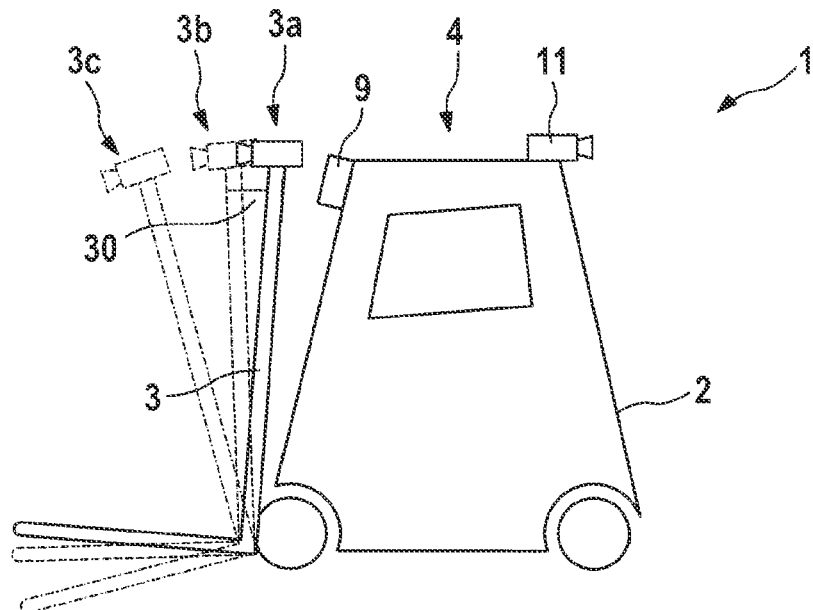
FIG. 2 schematically shows a detection system in a floor conveyor according to one specific embodiment of the present invention.
Figure 3:
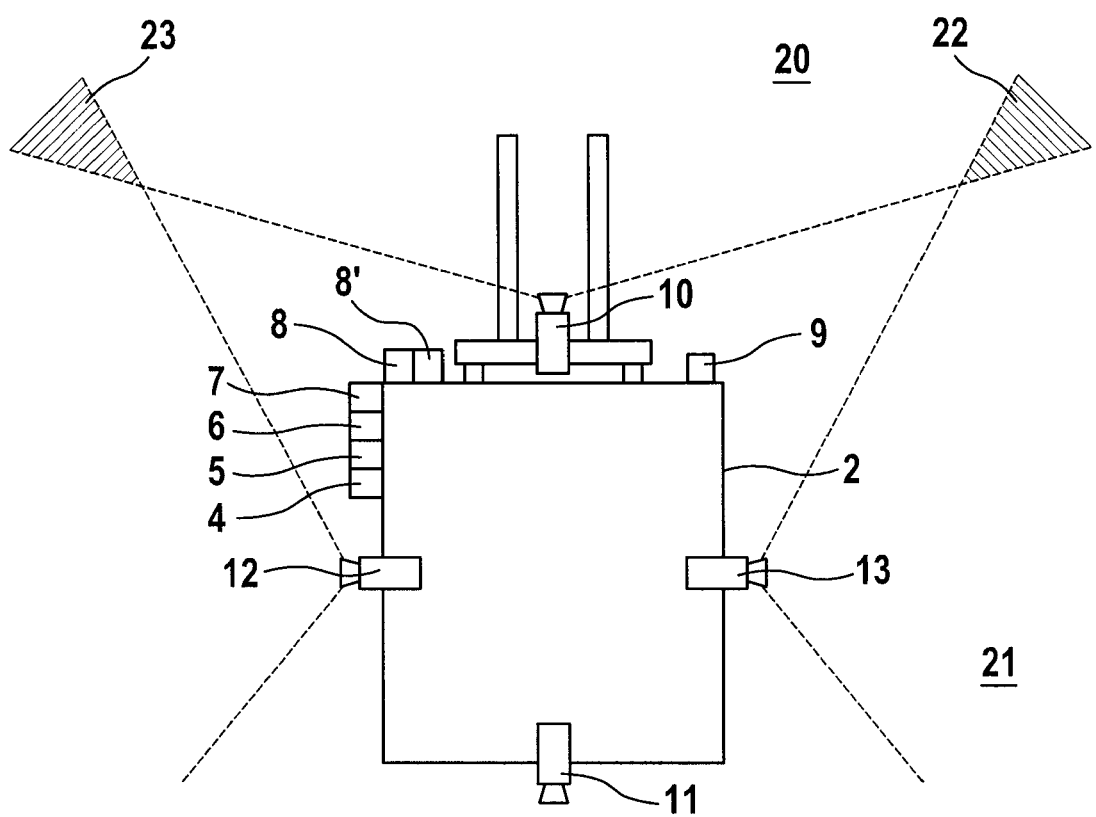
FIG. 3 schematically shows a top view of the detection system according to FIG. 2.

FIG. 2 schematically shows a detection system in a floor conveyor according to one specific embodiment of the present invention and FIG. 3 schematically shows a top view of the detection system according to FIG. 2.

In detail, a forklift 2 including a movable mast 3 is shown in FIGS. 2 and 3. At movable mast 3, a detection system 1 including a camera 10 is shown that is situated thereon in a fixedly installed manner. Camera 10 may thus be moved by moving mast 3. Camera 10 is directed forward in this case. Furthermore, a further camera 11, whose detection area is directed rearward, is situated on roof 4 of forklift 2.

Mast 3 of forklift 2 may—as assumed in the present case—carry out merely defined movements. In the following, exclusively a movement in the form of a rotation of mast 3 about a point of rotation is further assumed, as is schematically shown in FIG. 2. In the specific embodiment shown in FIGS. 2 and 3, a usual movement of camera 10 is modelled on the one hand and camera 10 is calibrated on the other hand, for multiple positions 3a, 3b, 3c, in this case for multiple inclination/rotation angles 30 of mast 3, to then be able to interpolate between these calibrations. The multiple calibrations are carried out once in advance. During runtime, i.e., during the later intended operation of forklift 2, they are therefore known and are then retrieved.

The movement of camera 10 may be modelled via the movement of mast 3. For this purpose, the relative position of camera 10 in relation to mast 3, i.e., distance and orientation, must be known on the one hand and, on the other hand, the point of rotation of mast 3 and rotation angle 30, about which it is rotated, must be known. The position of camera 10 is then extended to include a transformation matrix that describes the transformation of camera 10 due to the rotation of mast 3. Here, two cases may be differentiated:

A) The rotation angle of mast 3 may be metrologically determined and is known. For example, it might be applied as a signal to a CAN bus and read out by detection system 1. In this case, it may therefore be assumed as known.

B) Rotation angle 30 is not metrologically determined and is therefore unknown. Here, two variants may then be differentiated:

B1) The rotation angle is not determined and the appropriate calibration, as described further below, is ascertained in a different manner.

B2) Rotation angle 30 is determined during ongoing operation, for example via shared features with the aid of an adjacent rigid camera and it is proceeded as in case A).

The position of camera 10 in relation to mast 3, which is moreover needed for modelling, may be determined in advance during the calibration in offline phase S.

Depending on the force of the rotation of mast 3, the estimation of the position or the relative position of camera 10 in detection system 1, despite the modelling of the movement, may be correspondingly imprecise. Moreover, the theoretical assumption of a movement of camera 10 on a perfect circular trajectory may be violated in practice, for example through mechanical processes. Here, multiple calibration processes may then be carried out for different rotation angles 30. Depending on the desired accuracy, this may be carried out for a certain number of rotation angles, for example one calibration process per one degree rotation angle. Multiple calibration processes are thus carried out for defined rotation angles 30. For above-described case A), in which rotation angle 30 is known to detection system 1, a calibration may now also be ascertained for intermediate positions through interpolation between these supporting points—obtained through the position of camera 10 for different rotation angles 30—at each of which a calibration was carried out according to the modelled movement, for example along the geodetic line. This increases the accuracy, since the error propagation of the position estimation of camera 10 is prevented by additional measurements at the supporting points.

In a further specific embodiment, interpolation is dispensed with and only that calibration is selected that comes closest to rotation angle 30 of mast 3. Then, a modelling of the movement may also be dispensed with.

In relation to FIGS. 2 and 3, a first calibration may be carried out for camera position 3a and a second calibration may be carried out for camera position 3c. It is then possible to interpolate between these two calibrations along the modelled movement, i.e., the geodetic line, for all intermediate positions 3b. For camera positions close to camera position 3b, this method enables improved better position estimation than if merely a calibration (for camera position 3a) was available.

In case B1), in which rotation angle 30 is not known, it should be determined in a different manner, which one of the precomputed calibrations should be selected. In shown detection system 1 including four cameras 10, 11, 12, 13, in which two cameras 12, 13 are directed to the sides, correspondences may be determined in overlapping areas 22, 23 of front camera 10 and side cameras 12, 13. These correspondences may then be used to select from the quantity of the precomputed pieces of calibration information that calibration information that is most plausible for actual rotation angle 30. This then corresponds to above-described case A).

To improve the result, front camera 10 and side cameras 12, 13 may also be subdivided into two groups in a further specific embodiment, for example front camera and left-hand side camera 10, 12 form one group and front camera and right-hand side camera 10, 13 form the other group, for the purpose of obtaining two determinations that are independent from one another, of the calibration congruent with actual rotation angle 30. In a further specific embodiment, the result of the online calibration (steps S1 through S3) may also be used.

To sum up, at least one of the specific embodiments of the present invention has at least one of the following advantages:

More accurate calibration.

Higher flexibility in areas of application as well as with regard to detection systems.

Easier and more reliable calibration.

Example embodiments of the present invention are also described in the following numbered examples.

Example 1: A method for calibrating a detection system (4), wherein the detection system (4) includes at least one movable detection device (10, 11, 12, 13), including the steps:

ascertaining (S1) at least two possible different positions of the at least one movable detection device (10, 11, 12, 13), precalibrating (S2) the at least one movable detection device (10, 11, 12, 13) based on each of the at least two possible positions (3a, 3c), providing (S3) precalibration information for the at least two possible positions, ascertaining (T1) one instantaneous position of the at least one movable detection device (10, 11, 12, 13), ascertaining (T1') calibration information for the instantaneous position on the basis of the precalibration information, and calibrating (T2) the at least one movable detection device (10, 11, 12, 13) in the instantaneous position based on the provided calibration information.

Example 2: The method as recited in Example 1, wherein a movement of the movable detection device (10, 11, 12, 13) is modelled for ascertaining the possible positions (3a, 3c) of the at least one movable detection device (10, 11, 12, 13).

Example 3: The method as recited in one of Examples 1 through 2, wherein the precalibrating of the at least one movable detection device (10, 11, 12, 13) includes the ascertainment based on at least one intermediate position (3b) between the at least two possible positions (3a, 3c).

Example 4: The method as recited in Example 3, wherein the at least one intermediate position (3b) is ascertained between the at least two possible positions (3a, 3c) on the basis of a predefined connecting line model.

Example 5. The method as recited in Example 4, wherein the at least one intermediate positioning (3b) is ascertained with the aid of the connecting line model in the form of a geodetic line between the at least two possible positions (3a, 3c).

Example 6. The method as recited in one of Examples 1 through 5, wherein the instantaneous position of the at least one movable detection device (10, 11, 12, 13) is ascertained by the device itself or position information is provided for the at least one movable detection device (10, 11, 12, 13) from an external sensor device (9).

Example 7. The method as recited in one of Examples 1 through 6, wherein the calibration of the at least one movable detection device (10, 11, 12, 13) in the instantaneous position takes place based on the precalibration information of a position that comes closest to the instantaneous position.

Example 8. The method as recited in one of Examples 1 through 7, wherein the calibration of the at least one movable detection device (10, 11, 12, 13) in the instantaneous position takes place based on an interpolation on the basis of the precalibration information.

Example 9. The method as recited in one of Examples 1 through 8, wherein a plurality of detection devices (10, 11, 12, 13) is situated, of which at least one is movably situated, and the detection areas (20, 21) of at least two detection devices (10, 11, 12, 13) overlap in at least one overlapping area (22, 23) and calibration information for at least one detection device (10, 11, 12, 13) is provided, and correspondences are ascertained based on the at least one overlapping area (22, 23), and calibration information for calibrating the at least one movable detection device (10, 11, 12, 13) is provided in the instantaneous position based on the ascertained correspondences.

Example 10: The method as recited in one of Examples 1 through 9, wherein a plurality of detection devices (10, 11, 12, 13) is situated, of which at least one is movably situated, and the detection devices (10, 11, 12, 13) are subdivided into at least two groups and calibration information for calibrating the at least one movable detection device is provided in the instantaneous position based on the formed groups.

Example 11: A detection system, including
at least one movable detection device (10, 11, 12, 13),
a first ascertainment device (8) designed to ascertain at least two possible different positions (3a, 3c) of the at least one movable detection device (10, 11, 12, 13),
a precalibration device (7) designed to precalibrate the at least one movable detection device (10, 11, 12, 13) based on each of the at least two possible positions (3a, 3c),
a provision device (6) designed to provide precalibration information for the at least two possible positions (3a, 3c),
a positioning device (5) designed to ascertain an instantaneous position of the at least one movable detection device (10, 11, 12, 13),
a second ascertainment device (8') designed to ascertain calibration information for the instantaneous position on the basis of the precalibration information, and
a calibration device (4) designed to calibrate the at least one movable detection device (10, 11, 12, 13) in the instantaneous position based on the provided calibration information.

Although the present invention has been described on the basis of preferred exemplary embodiments, it is not limited thereto, but may be modified in multiple ways.

What is claimed is:

1. A method for calibrating a detection system, at least one movable detection device, the method comprising:
an offline phase, including:
ascertaining at least two possible different positions of the at least one movable detection device of the detection system by adjusting the position and orientation of the at least one movable detection device;
precalibrating the at least one movable detection device based on each of the at least two possible positions;
providing precalibration information, in the form of transformation matrices, for the at least two possible positions; and
an online phase, including:
ascertaining an instantaneous position of the at least one movable detection device;
ascertaining calibration information for the instantaneous position based on the precalibration information; and
calibrating the at least one movable detection device in the instantaneous position based on the ascertained calibration information;
wherein the steps of the offline phase are repeated until a required motion spectrum of the at least one movable detection device is completed.

2. The method as recited in claim 1, wherein a movement of the movable detection device is modelled for ascertaining the possible positions of the at least one movable detection device.

3. The method as recited in claim 1, wherein the precalibrating of the at least one movable detection device includes ascertaining at least one intermediate position between the at least two possible positions.

4. The method as recited in claim 3, wherein the at least one intermediate position is ascertained between the at least two possible positions based on a predefined connecting line model.

5. The method as recited in claim 4, wherein the at least one intermediate position is ascertained using the connecting line model in the form of a geodetic line between the at least two possible positions.

6. The method as recited in claim 1, wherein the instantaneous position of the at least one movable detection device is ascertained by the device itself or from position information is provided for the at least one movable detection device from an external sensor device.

7. The method as recited in claim 1, wherein the calibration of the at least one movable detection device in the instantaneous position takes place based on the precalibration information of a position that comes closest to the instantaneous position.

8. The method as recited in claim 1, wherein the calibration of the at least one movable detection device in the instantaneous position takes place based on an interpolation using the precalibration information.

9. The method as recited in claim 1, wherein there is a plurality of detection devices, which includes the at least one movable detection device, and detection areas of at least two detection devices overlap in at least one overlapping area, and calibration information for at least one of the detection devices is provided, and correspondences are ascertained based on the at least one overlapping area, and calibration information for calibrating the at least one movable detection device is provided in an instantaneous position based on the ascertained correspondences.

10. The method as recited in claim 1, wherein a plurality of detection devices is situated, which includes the at least one movable detection device, and the detection devices are subdivided into at least two groups and calibration information for calibrating the at least one movable detection device is provided in the instantaneous position based on the formed groups.

11. A detection system, comprising:

at least one movable detection device;

(a) a first ascertainment device to ascertain at least two possible different positions of the at least one movable detection device of the detection system by adjusting the position and orientation of the at least one movable detection device;

(b) a precalibration device to precalibrate the at least one movable detection device based on each of the at least two possible positions;

(c) a provision device to provide precalibration information for the at least two possible positions, wherein (a), (b) and (c) are used in an offline phase;

(d) a positioning device to ascertain an instantaneous position of the at least one movable detection device;

(e) a second ascertainment device to ascertain calibration information for the instantaneous position based on the precalibration information; and (f) a calibration device to calibrate the at least one movable detection device in the instantaneous position based on the ascertained calibration information, wherein (d), (e) and (f) are used in an online phase;

wherein the steps of the offline phase are repeated until a required motion spectrum of the at least one movable detection device is completed, after which the online phase is performed.

* * * * *